United States Patent
Sella (10) Patent No.: US 9,197,526 B2
(45) Date of Patent: *Nov. 24, 2015

(54) DETERMINING FEASIBILITY OF A NETWORK SERVICE USING A RING ANALYSIS

(71) Applicant: Level 3 Communications, LLC, Broomfield, CO (US)

(72) Inventor: William Thomas Sella, Parker, CO (US)

(73) Assignee: LEVEL 3 COMMUNICATIONS, LLC, Broomfield, CO (US)

( * ) Notice: Subject to any disclaimer, the term of this patent is extended or adjusted under 35 U.S.C. 154(b) by 3 days.

This patent is subject to a terminal disclaimer.

(21) Appl. No.: 14/190,596

(22) Filed: Feb. 26, 2014

(65) Prior Publication Data

US 2015/0085698 A1   Mar. 26, 2015

Related U.S. Application Data

(63) Continuation of application No. 14/034,707, filed on Sep. 24, 2013, now Pat. No. 8,699,328.

(51) Int. Cl.
| | |
|---|---|
| *H04J 1/16* | (2006.01) |
| *H04L 12/28* | (2006.01) |
| *H04L 12/26* | (2006.01) |
| *H04B 10/032* | (2013.01) |
| *H04J 3/08* | (2006.01) |
| *H04L 12/42* | (2006.01) |
| *H04L 12/701* | (2013.01) |
| *H04L 12/24* | (2006.01) |

(52) U.S. Cl.
CPC .......... *H04L 43/0876* (2013.01); *H04B 10/032* (2013.01); *H04J 3/085* (2013.01); *H04L 12/42* (2013.01); *H04L 41/147* (2013.01); *H04L 43/067* (2013.01); *H04L 43/0882* (2013.01); *H04L 45/00* (2013.01); *H04L 41/5019* (2013.01)

(58) Field of Classification Search
CPC ............................... H04B 10/032; H04J 3/085
See application file for complete search history.

(56) References Cited

U.S. PATENT DOCUMENTS

| | | | |
|---|---|---|---|
| 5,101,402 A | 3/1992 | Chiu et al. | |
| 5,546,542 A * | 8/1996 | Cosares et al. | 709/241 |
| 6,154,296 A | 11/2000 | Elahmadi et al. | |
| 6,412,000 B1 | 6/2002 | Riddle et al. | |
| 6,526,044 B1 | 2/2003 | Cookmeyer, II et al. | |
| 6,873,600 B1 | 3/2005 | Duffield et al. | |
| 7,016,300 B2 | 3/2006 | Luft et al. | |
| 7,403,988 B1 | 7/2008 | Blouin et al. | |
| 7,706,291 B2 | 4/2010 | Luft et al. | |
| 7,773,536 B2 | 8/2010 | Lloyd et al. | |
| 7,788,354 B2 | 8/2010 | Nag | |
| 7,940,676 B2 | 5/2011 | Griffin et al. | |
| 7,970,930 B2 | 6/2011 | Dobbins et al. | |
| 2001/0010682 A1 | 8/2001 | Schoenblum et al. | |
| 2003/0145246 A1 | 7/2003 | Suemura | |
| 2007/0195700 A1 | 8/2007 | Katoh et al. | |
| 2011/0196971 A1 | 8/2011 | Reguraman et al. | |
| 2012/0134497 A1 | 5/2012 | Roitshtein et al. | |

\* cited by examiner

*Primary Examiner* — Melanie Jagannathan (57) ABSTRACT

A mesh network (such as a mesh Ethernet network) is subdivided into rings. For each ring, a network utilization is assessed in both the clockwise and counter-clockwise directions around the ring. A user requests a particular network service. The network rings that would be utilized by the network service are determined. A maximum utilization of all the network rings utilized by the network service in both clockwise and counter-clockwise directions is determined. The determined maximum utilization is used to determine the feasibility of provisioning the requested network service.

18 Claims, 6 Drawing Sheets

DETERMINING FEASIBILITY OF A NETWORK SERVICE USING A RING ANALYSIS

BACKGROUND

1. Field

This field is generally related to determining the capacity of a network.

2. Related Art

Many applications, such as data storage, processing, and presentation applications, utilize a communication network in their operation. The communication network may, for example, provide a network connection that allows data to be transferred between two geographically remote locations. A network connection may span multiple links with different capacities. Networks may have different topologies depending on the pattern in which the links are connected to each other through switching devices. Network topologies include ring or mesh topologies.

The network connection may be provided by a service provider that has a common network it uses to provide service to many different users. To implement a network application, a business may request that the service provider maintain a network service at a particular service level, such as a specific level of bandwidth, latency, or jitter. For example, a business may request an Ethernet e-line connection between two of its locations with a bandwidth of 400 Mbit/second.

To service the request, the service provider must first determine whether its network has the capacity to provide the connection at the particular service level. This determination should take into account different conditions that the network may operate under.

BRIEF SUMMARY

In an embodiment, a computer-implemented method evaluates utilization of a mesh network including a plurality of switching devices. The method includes recording utilization of bidirectional links connecting the plurality of switching devices. For both directions of each of the links, a predicted utilization of the link in the direction is determined based on the recorded utilization of the link. For each of a plurality of rings in the mesh network, a predicted utilization is determined. To determine the predicted utilization, a clockwise maximum of the predicted utilizations of the links in the ring in the clockwise direction of the ring is determined. A counterclockwise maximum of the predicted utilizations of the links in the ring in the counterclockwise direction of the ring is also determined. Finally, the predicted utilization of the ring is determined based on the clockwise maximum and the counterclockwise maximum.

System and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

As mentioned above, a network user may order a new network connectivity service, such as a point-to-point Ethernet service or E-Line. Such a request may require a connection that spans multiple links with different available bandwidths. The connection should be set up in a way that meets the Service Level Agreement (SLA) with the user. SLA should be met both when the network is operating in a normal and a failover mode. Failover mode may occur when a link in the network fails and traffic that would otherwise travel over that link must be rerouted.

On receiving an order for a new network connectivity service, the network should be assessed to determine whether it can provide the connection at the service level requested. To assess whether the network can provide the connection, embodiments may divide the network into rings along the network connection's path. Each of the rings is assessed in the clockwise and counterclockwise directions to determine utilization or capacity. The total capacity in both the clockwise and counterclockwise directions is the capacity in the normal mode. When a link fails and enters failover mode, traffic that would otherwise travel in one direction around a ring may be routed in the other direction. Thus, the utilization of the ring during failover mode may be the sum of the utilization in both the clockwise and counterclockwise directions. Once each ring is assessed, the results are used to determine whether the network can provide the connection at the service level requested.

As is further described below, the assessments may also be used to determine the strain on various portions of the network. When a portion of a network is heavily strained, a network administrator may need to add capacity by, for example, altering the network configuration, or adding circuits or switches.

Also, as further described below, the clockwise and counterclockwise ring assessments may be made for periodic time slices. For example, the clockwise and counterclockwise ring assessments may be made weekly for a 5 minute interval. This may be used to forecast utilization during the same 5 minute interval in future weeks. Forecasting utilization in this way may be useful, for example, to schedule planned network outages and maintenance.

The Detailed Description that follows is divided into three sections. The first section describes, with respect to FIGS. 1A and 1B, a network that includes multiple interconnected switching devices and provides dedicated connections between at least two locations. The second section describes, with respect to FIGS. 2A-5, determining the feasibility of setting up a connection on a ring network based on the historic utilization of network links. The third section describes, with respect to FIG. 6, a system for determining the feasibility of setting up a connection on a mesh network, evaluating the performance of the network, and providing the service level agreed upon with the users.

Network Link Utilization

Figure 1A:
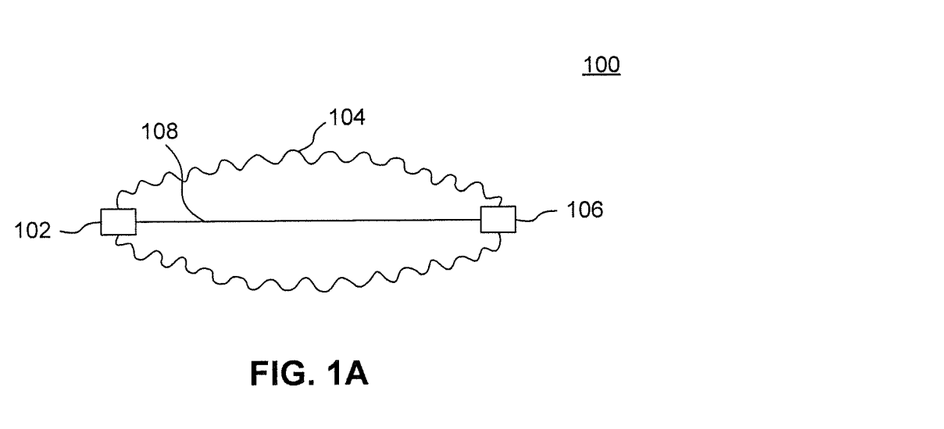
FIG. 1A is a diagram that illustrates a system for providing a connection to a user of a network.

FIG. 1A illustrates a system 100 that provides a communication network 104. The communication network 104 may be a local area network (LAN), metropolitan area network (MAN), or wide area network (WAN). It may utilize any point-to-point or multipoint-to-multipoint networking protocols. The network access protocols used may include, for example, Ethernet, Asynchronous Transfer Mode (ATM), High-Level Data Link Control (HDLC), Frame Relay, Synchronous Optical Networking (SONET)/Synchronous Digital Hierarchy (SDH), or Passive Optical Network (PON).

System 100 provides connection 108 between locations 102 and 106. The locations 102 and 106 are connected to switching devices at the edge of the network. Switching devices may, for example, be access switches that serve as interfaces between end users or routers and the network 104. They may be connected by a network of communications links, other switches, and routers. The term "switching device" as used herein refers to both network switches and routers.

Connection 108 may be a dedicated network connection. A dedicated network connection is a connection with bandwidth reserved for a particular user. In other words, no other user of the network can have access to the bandwidth reserved for a particular user on a dedicated connection. A dedicated network connection can be seen as a private connection for one user. Such a dedicated connection may be point-to-point, in which the connection connects two points on the network. On the other hand, the connection may also be multipoint-to-multipoint, in which a set of one or more points on the network is connected to a second set of one or more network points.

In an example, communication network 104 may utilize an Ethernet protocol. In that example, connection 108 may be an Ethernet E-Line. E-Line is a data service defined by the Metro Ethernet Forum, providing a point-to-point Ethernet connection between a pair of user network interfaces.

The connectivity provided by connection 108 may have particular, pre-defined service levels. For example, connection 108 may transfer data between locations 102 and 106 at a particular bandwidth, latency, or jitter. Bandwidth is the amount of data that a communication line can transfer over a particular time period, often measured in bit per second (bps) or multiples of it (for example Mega bit per second or Mbps).

When a user requests connection 108, the resources available on network 104 are evaluated to determine whether links to be assigned to the connection can meet the service level requirement of the connection. For example, the links to be assigned to the connection may be evaluated to determine whether they have available capacity equal or greater than the bandwidth required by the connection. Evaluating capacity on a single link is illustrated with respect to FIG. 1B.

Figure 1B:
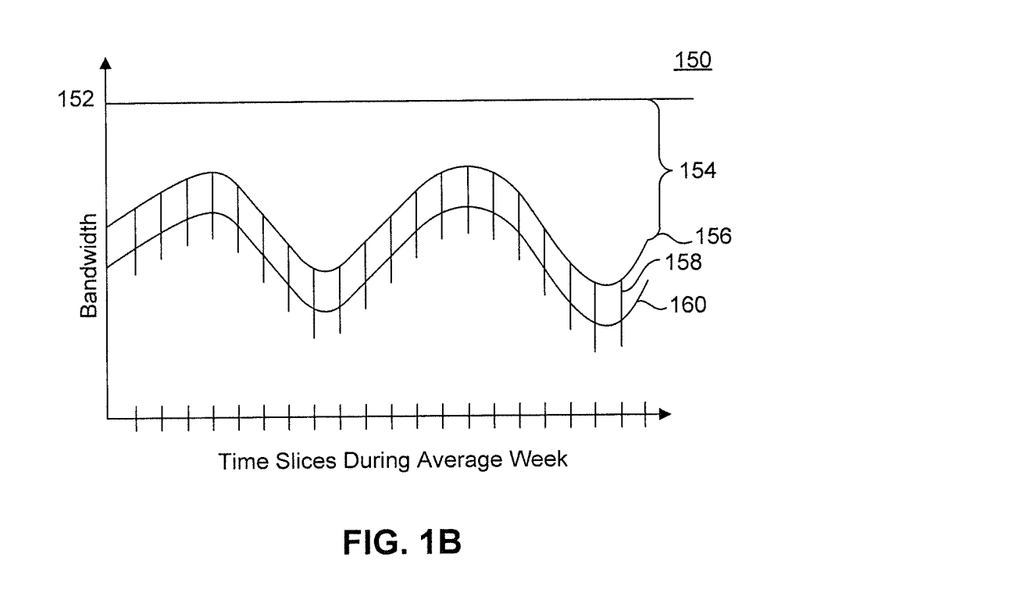
FIG. 1B is a chart that illustrates how the periodic bandwidth usage in the network may be used to forecast future availability.

FIG. 1B shows a chart 150 that illustrates how the historic periodic bandwidth usage on a link in the network may be used to forecast future availability.

As illustrated in the FIG. 1B, typical utilization of some network resources, such as bandwidth, exhibits a cyclical recurring pattern. A server may collect utilization data from network devices, such as switching devices, over time. For example, the server may collect data on a particular five minute time slice for one week. A skilled artisan would recognize that other intervals and periods may be used.

The usage data collected over time is illustrated in chart 150. Each time slice has an average bandwidth usage 160 and may vary as illustrated by range 158. Because utilization of the time slice may vary, a 95th percentile of usage data may be determined to forecast utilization of the link during a particular time slice. The 95th percentile may be determined by first sorting the values of different bandwidth levels used on a link in ascending order. Ninety-five out of 100 of the sorted different bandwidth levels are at or below the 95th percentile value.

For example, during a particular interval, an average utilization at a particular time slice may be 400 Mbps. While usage during previous time slices may vary, it may be below 500 Mbps 95% of the time. In that case, the forecasted usage 156 is 500 Mbps.

The total capacity 152 is the total capacity available in the network on a given link. This may be due to, for example, physical limitations of the link. For example, the link may be a 1 Gbps or 10 Gbps Ethernet line. The difference between the total capacity 152 and the highest forecasted usage 156 for a given time slice is determined as the forecasted availability 154. If the forecasted availability 154 meets or exceeds the required bandwidth for the new connection using the link, then the setting up of the connection is feasible.

While determining feasibility may be relatively straightforward when a connection only utilizes a single link, generally connections will utilize multiple links over a complex network topology. Embodiments determine the feasibility of setting up a connection 108, when the network has a ring or mesh topology as described below.

Determining Connection Feasibility Using Rings

Figure 2A:
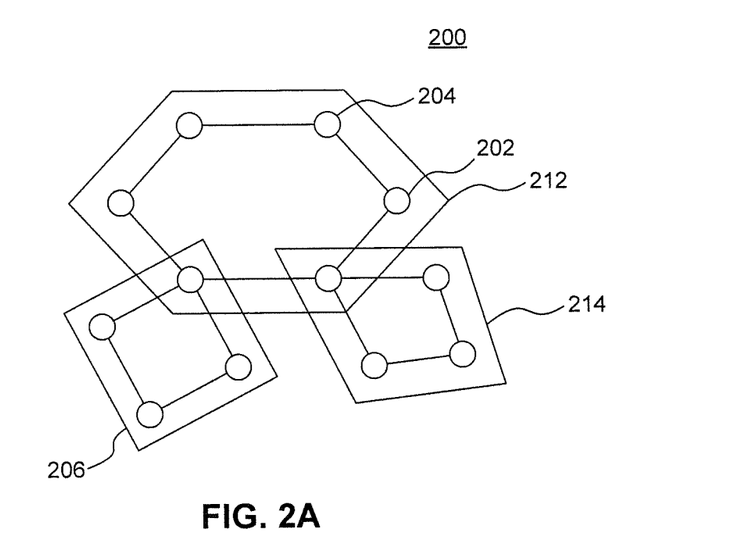
FIG. 2A is a diagram that illustrates a network that includes multiple rings and provides connection to a user of a network.

FIG. 2A illustrates a network 200 that includes multiple rings. Network 200 includes a plurality of nodes interconnected by links. The nodes may be switching devices and the links may be communication links, such as fiber optic lines.

The nodes in network 200 are organized into rings 212, 214 and 206. Each of rings 212, 214 and 206 shares at least one node with another ring. A new connection request using network 200 is for example a connection between node 202 and 204. That connection spans only one ring 212.

Figure 2B:
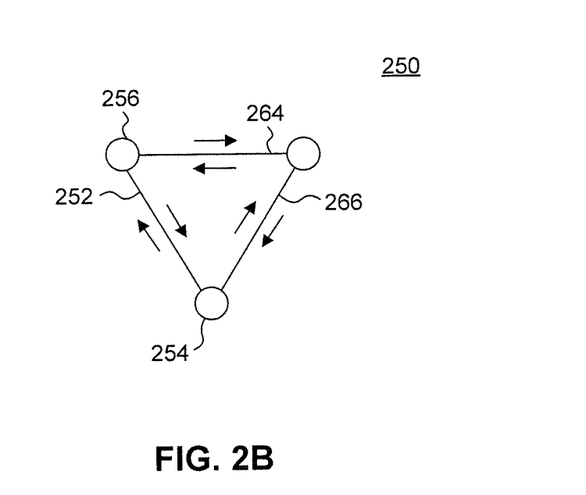
FIG. 2B is a diagram illustrating a bidirectional ring that includes multiple links and switches and can transmit data in clockwise and counterclockwise directions.

If a connection spans on only one ring, the feasibility of setting up that connection can be determined by considering the utilization of only the links on that ring, as illustrated, for example, in FIG. 2B.

FIG. 2B is a diagram illustrating a bidirectional ring 250. Ring 250 includes multiple links and switches and can carry data clockwise and counterclockwise. Ring 250 includes a plurality of nodes, including nodes 254 and 256, connected in a ring using links. Nodes 254 and 256 are connected using a link 252.

Using link 252, nodes 254 and 256 can communicate with one another. The data transmitted between nodes 254 and 256 include both data originating from those nodes (e.g., when they are endpoint or access switches) and data routed from other nodes. Similarly, nodes 254 and 256 may either be destinations for the data (e.g., in the case in which they are endpoint or access switches on a user's premises) or routes for the data to other nodes.

To communicate, node 254 and node 256 use both directions of link 252. Under normal operation, data transmitted from node 254 to node 256 would travel on link 252 in the clockwise direction, and data transmitted from node 256 to node 254 would travel on link 252 in the counterclockwise direction.

If link 252 fails, the data can be rerouted in the opposite direction on the ring to continue the data transfer. Data that would normally travel on link 252 in the clockwise direction with be routed onto links 264 and 266 in the counterclockwise direction, and data that would normally travel in on link 252 in the counterclockwise direction with be routed onto links 264 and 266 in the clockwise direction. In this way, when link 252 fails, each of links 264 and 266 on network 250 carry both the traffic that they would normally handle and the traffic that would be routed through link 252.

To determine the feasibility of setting up a connection, an embodiment calculates both the maximum utility of the links in the normal operation of the ring and in failover mode. The maximum link utilization in the normal ring operation is the greater of the clockwise maximum and the counterclockwise maximum link utilizations. A predicted utilization of the ring for the time slice under failover operating conditions is the sum of the clockwise maximum and the counterclockwise maximum.

Together, the set of maximum predicted utilizations for the normal mode and the failover mode form a metric that may be used to make a decision on whether or not to allow a new connection. It may also help the network operator make decisions regarding increasing the network capacity.

These decisions may factor in the physical capacity limitations of the links. Assuming all links have equal physical capacity limitations for bandwidth, to determine the feasibility of a connection set up on a ring network, an embodiment calculates the maximum predicted link utilization. In this scenario, the available bandwidth for a new connection is the capacity or the upper limit bandwidth set by the operator for the network links, minus the maximum link utilization.

If links in a network have different capacities or different upper limits for bandwidth, an embodiment finds the predicted lowest available bandwidth of the links on a new connection path, referred to as the bottleneck link. In such an embodiment, determining the feasibility on a ring network includes determining the bottleneck clockwise and counterclockwise links and selecting the less of the two as the bandwidth bottleneck for the normal mode.

To predict the bottleneck bandwidth in failover mode, the embodiment adds the maximum clockwise link utilization to all counter clockwise link utilization values and selects the minimum available bandwidth among all the counterclockwise links to find the first bottleneck bandwidth. The embodiment then adds the maximum counterclockwise link utilization value to all other clockwise link utilizations and selects the minimum available link capacity among the clockwise links to find the second bottleneck bandwidth. The embodiment then selects the lesser of the first bottleneck and second bottleneck bandwidth as the feasible bandwidth for a new connection in failover mode.

Figure 3:
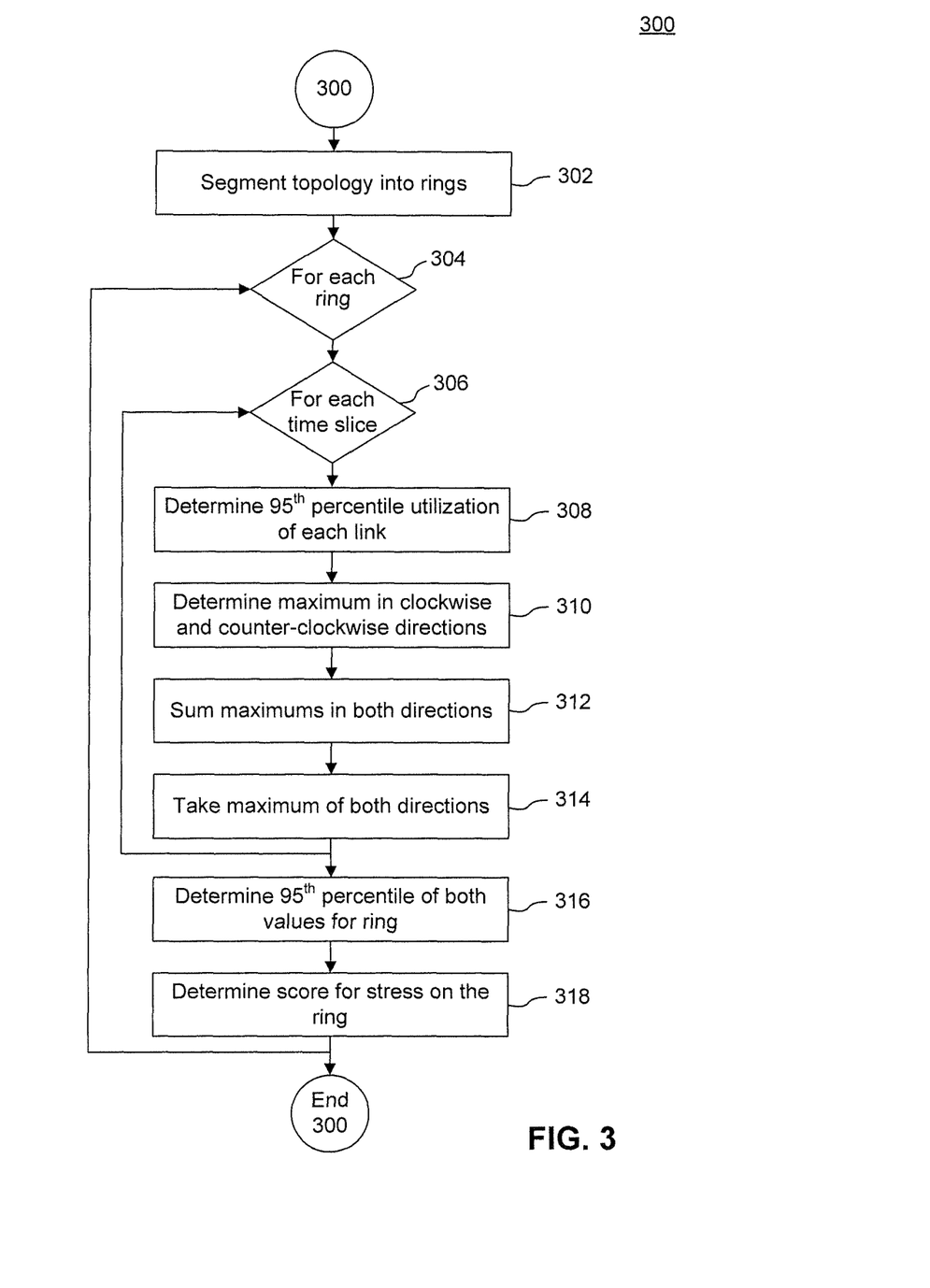
FIG. 3 is a flowchart that illustrates a method for determining scores that indicate stress on various network rings.
Figure 4:
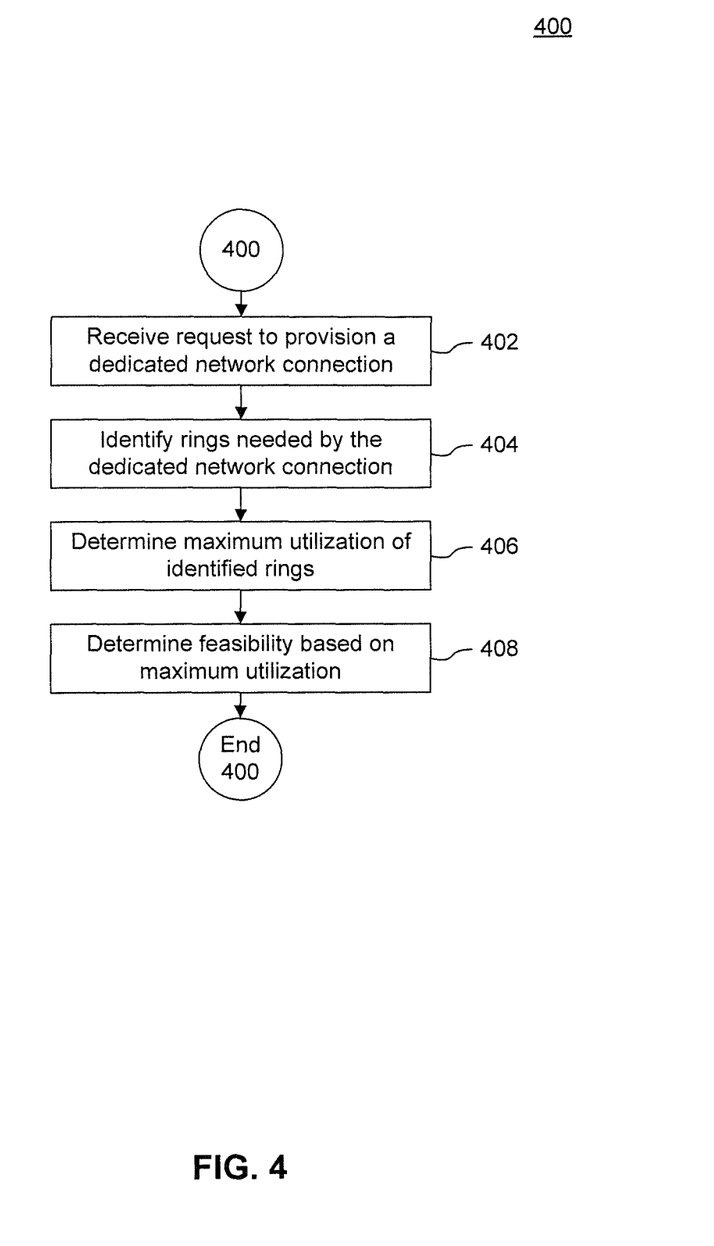
FIG. 4 is a flowchart that illustrates a method for determining feasibility of establishing a connection in the network.

Determining feasibility of a new connection and the availability of additional bandwidth is described in more detail with respect to FIGS. 3-4.

FIG. 3 is a flowchart that illustrates a method 300 for determining scores indicating stress on particular network rings.

Method 300 begins by segmenting the network topology into rings at step 302. For example in FIG. 2A above, network 200 can be segmented into rings 212, 214, and 206. In this example, each ring has at least one node in common with another ring. In an embodiment, the network topology may be segmented such that each ring represents a closed loop of switching devices connected by links. In a further embodiment, described below with respect to FIG. 5, the plurality of rings is determined based on a hierarchy of underlying rings.

For each of the rings identified in step 302, method 300 repeats steps 308-318 at decision block 304 to determine a score indicating stress on the ring. To determine a score indicating stress on the ring, method 300 repeats steps 308-314 for each time slice to determine utilization during a particular time slice.

At step 308, the 95th percentile utilization of each link is determined. The actual used bandwidth of the link can have significant variation over time. Taking the 95th percentile of the actual used bandwidth of the link gives a reasonable upper limit prediction for link utilization. The predicted utilizations are determined in both the clockwise and counterclockwise directions during the particular time slice. In an example, the particular slice may be 6:55 pm on Tuesdays. In that example slice, predicted utilizations are determined for each link in both the clockwise and counterclockwise directions at 6:55 pm on Tuesdays.

Applying that example to the network in FIG. 2B, link 252 may, 95% of the time, carry traffic not exceeding 500 Mbps in the clockwise direction and 350 Mbps in the counterclockwise direction; link 264 may, 95% of the time, carry traffic not exceeding 200 Mbps in the clockwise direction and 300 Mbps in the counterclockwise direction; and link 266 may, 95% of the time, carry traffic not exceeding 300 Mbps in the clockwise direction and 600 Mbps in the counterclockwise direction.

At step 310, a maximum of the predicted utilizations in both the clockwise and counterclockwise directions is determined. In particular, a maximum is taken from among the predicted utilizations of the links in the ring in the clockwise direction during the particular time slice, and a maximum is taken from among the predicted utilizations of the links in the ring in the counterclockwise direction during the particular time slice.

In the example above and illustrated in FIG. 2B, at 6:55 pm on Tuesdays, the maximum in the counterclockwise direction is on link 266 at 600 Mbps and the maximum in the clockwise direction is on link 252 at 350 Mbps.

Next, at steps 312 and 314, process 300 determines a predicted utilization of ring for the time slice based on the clockwise maximum and the counterclockwise maximum.

At step 312, the process 300 the maximum of both directions together. This determines the overall worst-case scenario link utilization of the ring, when it is operating in failover mode. In the running example slice of 6:55 pm on Tuesdays, the worst-case scenario link utilization of the ring is the sum of 600 Mbps and 350 Mbps, which is 950 Mbps. If the links on the ring are 1 Gbps Ethernet lines, then, if a failover occurred at 6:55 pm on a Tuesday, the ring would likely be running close to full capacity.

At step 314, the process 300 determines the greater value of the maximum link utilization in both directions. This determines the overall worst case scenario of the link utilization of the ring when the ring is operating in normal mode. The greater value from the two directions is selected because a new connection can travel the ring in either direction. So, the maximum link utilization the connection will encounter will be the greater value of both directions. In this way, step 314 determines a maximum utilization value when the link is operating in normal mode.

In the running example time slice, the maximum utilization value when the link is operating in normal mode is the 600

Mbps, the counterclockwise maximum, because it is greater than the clockwise maximum, which is 350 Mbps.

Process 300 repeats steps 308 through 314 to determine utilization values in both the normal and failover operating modes during each time slice. For example, steps 308 through 314 may repeat to determine the utilization values in both the normal and failover operating modes for every five minute interval during a week.

At step 316, process 300 determines the 95th percentile of both values from steps 312 and 314 for the current ring. In this way, step 316 aggregates data across the various time slices to determine an overall maximum utilization on a ring in normal operation mode and failover mode.

Step 316 translates the value set of step 316 to a score that shows the stress of the ring. The score is used by a network operator to perform certain actions on the network. For example, a score range can be a value between 0 and 100, where 100 shows the highest traffic load stress on the network. In this example, a score of 50 can indicate that it is necessary for the network operator to closely monitor the performance of the network. A score of 70 can indicate that it is necessary to increase the capacity of the ring in the near future, such as 10 days. A score of 90 can indicate that it is necessary to immediately increase the capacity of the ring.

Process 300 repeats steps 306 through 318 for each ring in the network to determine scores indicating the stress on each ring of the network.

Once determined, the utilization values and scores may be used to determine the feasibility of establishing a new connection in the network.

FIG. 4 is a flowchart that illustrates a process for determining the feasibility of establishing a connection in the network. Process 400 begins at step 402 when a request is received for a dedicated network connection to be provided between at least two locations. For example, in the network illustrated in FIG. 2A, the request may be for an Ethernet e-line that provides a 400 Mbps connection between locations 204 and 206.

At step 404, process 400 identifies which of the rings would be utilized to provide the requested dedicated network connection between the at least two locations. To identify the rings, a set of links and network switches may be selected using a routing algorithm such as a shortest path or a weighted shortest path algorithm. In the example illustrated in FIG. 2A, rings 212 and 216 may be utilized to provide the requested connection between locations 204 and 206.

At step 408, process 400 determines whether the requested dedicated network connection is feasible based on the overall predicted utilizations (in both normal and failover mode) determined in step 406 for the rings identified in step 404. When all links have the same capacity, the maximum utilization of the identified rings shows the bottleneck link on the route of the connection during each mode of operation. The utilization of the bottleneck link may be used to determine the total available bandwidth between two connections. If the total available bandwidth exceeds the amount requested, the connection is feasible. Otherwise, the connection is not feasible.

For example, in FIG. 2A, ring 212 may have a maximum utilization during normal operation of 400 Mbps and a maximum utilization during failover operation of 600 Mbps; ring 206 may have a maximum utilization during normal operation of 500 Mbps and a maximum utilization during failover operation of 700 Mbps. In this case, ring 206 is more heavily utilized during both normal and failover modes of operation. If the links on the network are 1 Gbps Ethernet lines, the available capacity is 500 Mbps during normal operation and 300 Mbps during failover operation. The user request of 400 Mbps may not be feasible if the service level agreement guarantees that level of bandwidth during all modes of operation.

In an embodiment, the links in the network may have different capacities. In this instance, instead of evaluating the maximum link utilization, process 300 would evaluate the minimum available bandwidth. At step 308, the value determined for each link would be the 95% of the availability of the link. For example, a value of 500 Mbps would indicate that the link has at least 500 Mbps of spare capacity during 95% of a particular time slice. At step 310, the minimum capacity of the links in both the clockwise and counterclockwise directions would be determined. At step 312, the utilization values would still be summed, but the summed value would be subtracted from the lowest bandwidth link in the ring. This would determine the failover availability. At step 312, the failover under normal operation conditions is determined to be the minimum of both clockwise and counterclockwise directions. At step 406, the minimum available bandwidth among the rings used by a connection is used to determine the feasibility of the connection at step 408. In this way, a skilled artisan would recognize that the disclosed method may operate by evaluating the bandwidth available on the respective links, as opposed to the bandwidth utilized.

The network in FIG. 2A is a relatively simple mesh. It is relatively easy to identify and assess its component rings. For more complex topologies, the rings may be organized into a hierarchy, as illustrated with respect to FIG. 5.

Figure 5:
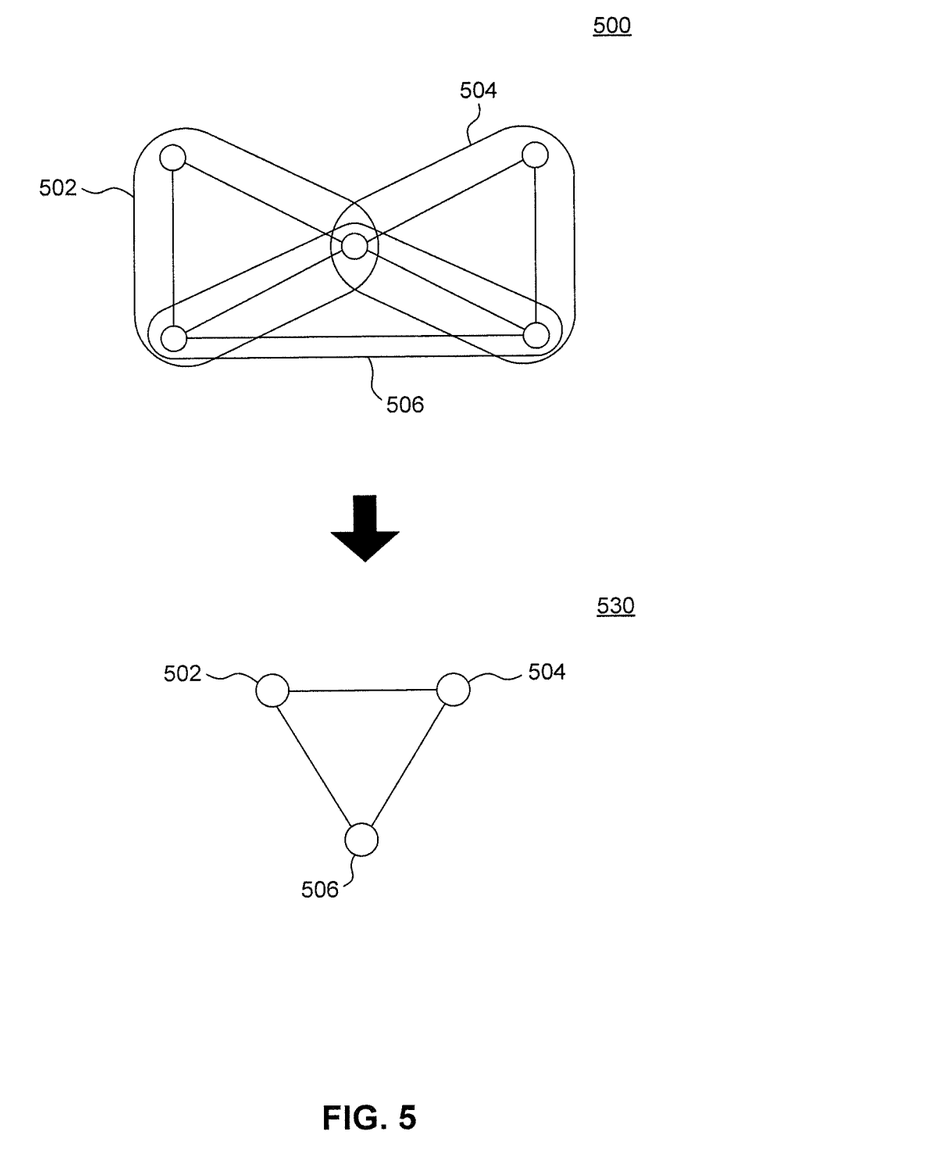
FIG. 5 is a diagram that illustrates modeling a mesh network with a hierarchy of rings.

FIG. 5 illustrates that the rings may be organized into a hierarchy. FIG. 5 includes a diagram 500 illustrating a mesh network with three rings and a diagram 530 illustrating a simplification of the mesh network with only a simple ring. In diagram 500, all the rings in the network are identified: ring 502, 504, and 506. The rings may be closed loops of switching devices connected by links.

In diagram 530, each of rings ring 502, 504, and 506 is denoted as a virtual node. Rings that have any shared nodes with each other are connected together with virtual links. Any connection between different nodes on different loops identified in step 500 is between the corresponding virtual nodes at step 530. The utilization of the virtual links of level 530 is the maximum link utilization, from level 500, on the rings corresponding to the virtual nodes at the end of the virtual link of level 530.

After the network is simplified to a level that distinct rings are identified, process 300 and process 400 will determine the feasibility of a connection using the virtual rings of the simplified level. In this way, aspects of the disclosure may be applied to more complex network topologies.

System

Figure 6:
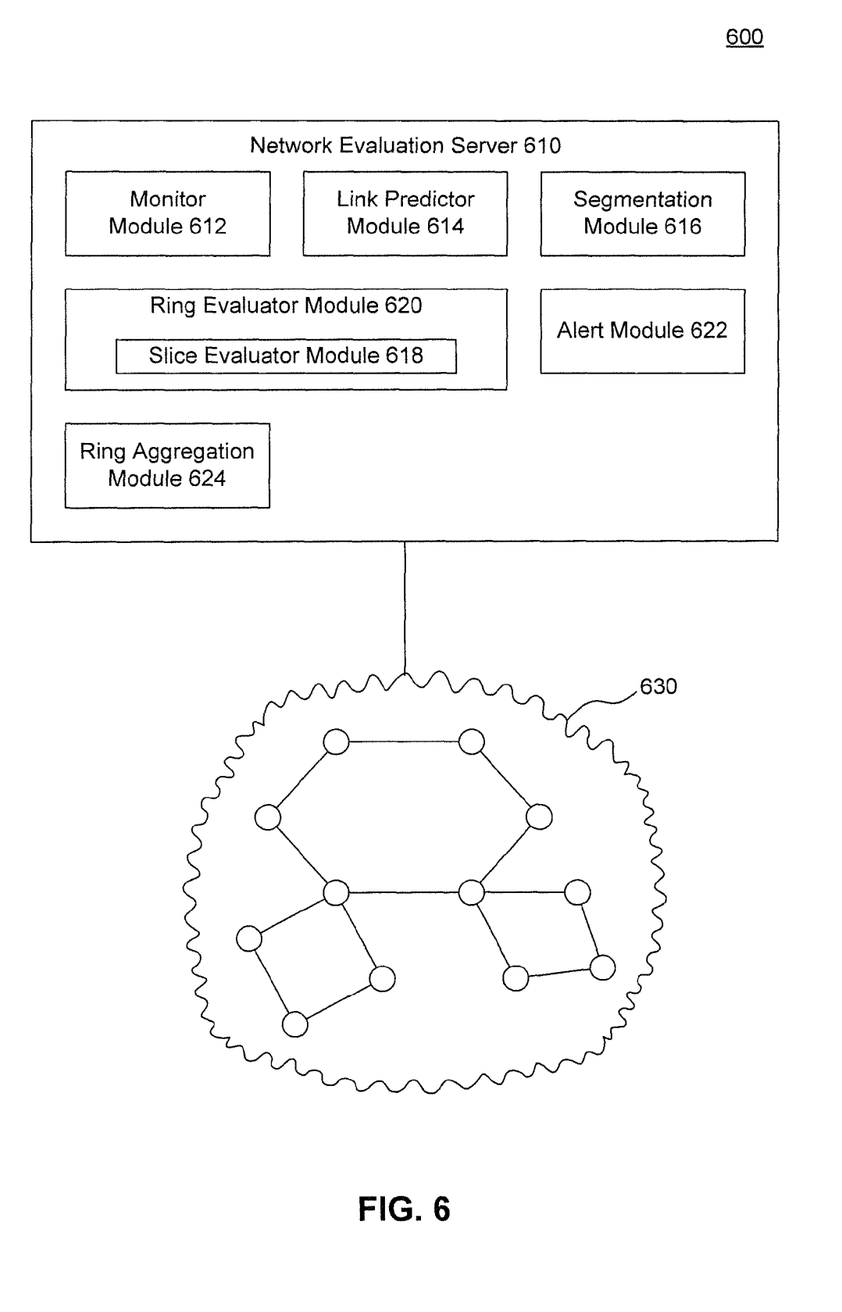
FIG. 6 is a diagram that illustrates a system for evaluating utilization in a network by segmenting the network to rings and monitoring the utilization of network links.

FIG. 6 illustrates a system 600 for evaluating the network performance, which may operate according to the methods disclosed in FIGS. 3 and 4. System 600 includes a network evaluation server 610 that is connected to various devices on a network 630 to gather information. Network evaluation server 610 includes a variety of modules discussed in turn: a monitor module 612, a link predictor module 614, a segmentation module 616, a slice evaluator module 618, a ring evaluator module 620, an alert module 622, and a ring aggregation module 624.

Monitor module 612 records utilization of bidirectional links connecting the multiple switching devices at different time slices during previous time cycles. The time cycles represent periodic time intervals having a pattern of repeated utilization. The time slices also represent sub-intervals in the periodic time intervals.

For each of the links, link predictor module 614 determines a predicted utilization of the link based on the recorded utilization of the link. In an embodiment, link predictor module 614 may determine a predicted utilization during each time slice throughout a period, such as a week. For a particular time slice, link predictor module 614 predicts utilization during the slice based on the utilization of the link during the same time slice in the previous time cycles recorded by monitor module 612. For each link, predictor module 614 may determine a link in both a clockwise and counterclockwise direction.

Segmentation module 616 segments the mesh network into rings. Segmentation module 616 may determine the rings in such a way that each ring represents a closed loop of switching devices connected by links.

Slice evaluator module 618 determines maximum values in the clockwise and counterclockwise directions of the rings determined by segmentation module 616. The maximum values are based on the predictions made by link predictor module 614. In particular, for each ring during each time slice, slice evaluator module 618 determines a clockwise maximum of the predicted utilizations of the links in the ring in the clockwise direction of the ring during the time slice in the previous time cycles. Also, slice evaluator module 618 determines a counterclockwise maximum of the predicted utilizations of the links in the ring in the counterclockwise direction of the ring during the time slice in the previous time cycles. Finally, based on the clockwise maximum and the counterclockwise maximum, slice evaluator module 618 predicts a utilization of the ring during the time slice.

Slice evaluator module 618 may determine a predicted utilization under a normal mode of operation and a failover mode of operation. Under normal operating conditions, slice evaluator module 618 determines a predicted utilization to be the greater of the clockwise maximum and the counterclockwise maximum. Under failover operating conditions, slice evaluator module 618 determines a predicted utilization to be the sum of the clockwise maximum and the counterclockwise maximum.

For each of the rings in the mesh network, ring evaluator module 620 signals slice evaluator module 618 to determine predicted utilizations for the ring for the respective time slices. Based on the utilization during the respective slices, ring evaluator module 620 determines an overall predicted utilization of the ring based on the predicted utilizations for the ring for the respective time slices determined by the slice evaluator module.

Alert module 622 determines whether the overall predicted utilization for a ring in the set of rings exceeds a threshold. When the overall predicted utilization of the ring is determined to exceed the threshold, alert module 622 sends an alert indicating that the ring needs to be modified to accommodate additional traffic.

Ring aggregation module 624 determines a new set of rings based on the intermediate set of rings at a previous level, such that each ring representing a closed loop of the set of rings from the previous level is connected by overlapping switching devices. Ring aggregation module 624 may operate as described above with respect to FIG. 5.

CONCLUSION

A skilled artisan would recognize that in addition to determining the feasibility of a new network connection, the systems and methods disclosed herein may be used to determine the feasibility of a change in an existing network connection. For example, if a user wants to increase the bandwidth for a connection, the above systems and methods may be used to determine whether the existing network can provide the increased bandwidth. Additionally, if a user wants to increase the bandwidth for a particular period of time in the future, the utilization predicted for particular time slices may be used to determine whether the increase is viable for the particular future time period.

Further, the time-slice specific utilization data may be used to schedule link outages in a way that ensures continues network service.

Each of the servers and modules in FIG. 6 may be implemented in hardware, software, firmware, or any combination thereof.

Each of the servers and modules in FIG. 6 may be implemented on the same or different computing devices. Such computing devices can include, but are not limited to, a personal computer, a mobile device such as a mobile phone, workstation, embedded system, game console, television, set-top box, or any other computing device. Further, a computing device can include, but is not limited to, a device having a processor and memory, including a non-transitory memory, for executing and storing instructions. The memory may tangibly embody the data and program instructions. Software may include one or more applications and an operating system. Hardware can include, but is not limited to, a processor, a memory, and a graphical user interface display. The computing device may also have multiple processors and multiple shared or separate memory components. For example, the computing device may be a part of or the entirety of a clustered computing environment or server farm.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for evaluating utilization of a mesh network including a plurality of switching devices, comprising:
   (a) monitoring, on a computing device, utilization of bidirectional links connecting the plurality of switching devices;

(b) for both directions of each of the links, determining, on the computing device, a predicted utilization of the link in the direction based on the utilization of the link monitored in (a);

for each of a plurality of rings in the mesh network:

(c) determining, on the computing device, a clockwise maximum of the predicted utilizations of the links in the ring in the clockwise direction of the ring;

(d) determining, on the computing device, a counterclockwise maximum of the predicted utilizations of the links in the ring in the counterclockwise direction of the ring; and (e) determining, on the computing device, a predicted utilization of the ring based on the clockwise maximum and the counterclockwise maximum.

2. The computer-implemented method of claim 1, further comprising:

(g) segmenting the mesh network to determine the plurality of rings such that each ring representing a closed loop of switching devices is connected by links.

3. The computer-implemented method of claim 1, further comprising:

(g) segmenting the mesh network to determine an intermediate plurality of rings such that each ring representing a closed loop of switching devices is connected by links; and (h) determining the plurality of rings based on the intermediate plurality of rings such that each ring representing a closed loop of the intermediate plurality of rings is connected by overlapping switching devices.

4. The computer-implemented method of claim 1, further comprising:

(g) receiving a request for a dedicated network connection to be provided by the mesh network between at least two locations;

(h) identifying which of the plurality of rings would be utilized to provide the requested dedicated network connection between the at least two locations; and (i) determining whether the requested dedicated network connection is feasible based on the overall predicted utilizations determined in (f) for the plurality of rings identified in (h).

5. The computer-implemented method of claim 1, further comprising:

(g) determining whether the overall predicted utilization for a ring in the plurality of rings exceeds a threshold; and (h) when the overall predicted utilization of the ring is determined to exceed the threshold, sending an alert indicating that the ring needs to be modified to accommodate additional traffic.

6. The computer-implemented method of claim 1, wherein the monitoring (a) comprises, repeatedly for a plurality of times, collecting, from switching devices connected to the bidirectional links, data indicating an amount of traffic flowing over the bidirectional link at the time.

7. A system for evaluating utilization of a mesh network including a plurality of switching devices, comprising:

a computing device;

a monitor module, implemented on the computing device, that monitors the utilization of bidirectional links connecting the plurality of switching devices;

a link predictor module, implemented on the computing device, that, for both directions of each of the links, determines a predicted utilization of the link in the direction based on the monitored utilization of the link; and an ring evaluator module, implemented on the computing device, that, for each of a plurality of rings in the mesh network, (i) determines a clockwise maximum of the predicted utilizations of the links in the ring in the clockwise direction of the ring in previous time cycles, (ii) determines a counterclockwise maximum of the predicted utilizations of the links in the ring in the counterclockwise direction of the ring in previous time cycles, and (iii) determines a predicted utilization of the ring based on the clockwise maximum and the counterclockwise maximum; and (iv) determines a predicted utilization for the ring.

8. The system of claim 7, further comprising:

a segmentation module that segments the mesh network to determine the plurality of rings such that each ring representing a closed loop of switching devices is connected by links.

9. The system of claim 7, further comprising:

a segmentation module that segments the mesh network to determine an intermediate plurality of rings such that each ring representing a closed loop of switching devices is connected by links; and a ring aggregation module that determines the plurality of rings based on the intermediate plurality of rings such that each ring representing a closed loop of the intermediate plurality of rings is connected by overlapping switching devices.

10. The system of claim 7, further comprising:

a feasibility module that: (i) receives a request for a dedicated network connection to be provided by the mesh network between at least two locations; (ii) identifies which of the plurality of rings would be utilized to provide the requested dedicated network connection between the at least two locations; and (iii) determines whether the requested dedicated network connection is feasible based on the determined overall predicted utilizations for the plurality of identified rings.

11. The system of claim 7, further comprising:

an alert module that: (i) determines whether the overall predicted utilization for a ring in the plurality of rings exceeds a threshold, and (ii) when the overall predicted utilization of the ring is determined to exceed the threshold, sends an alert indicating that the ring needs to be modified to accommodate additional traffic.

12. The system of claim 7, wherein the monitor module, repeatedly for a plurality of times, collects, from switching devices connected to the bidirectional links, data indicating an amount of traffic flowing over the bidirectional link at the time.

13. A program storage device tangibly embodying a program of instructions executable by at least one machine to perform a method for evaluating utilization of a mesh network including a plurality of switching devices, the method comprising:

(a) monitoring utilization of bidirectional links connecting the plurality of switching devices;

(b) for both directions of each of the links, determining a predicted availability of the link in the direction based on the utilization of the link monitored in (a);

for each of a plurality of rings in the mesh network:

(c) determining a clockwise minimum of the predicted availability of the links in the ring in the clockwise direction of the ring in previous time cycles;

(d) determining a counterclockwise minimum of the predicted availability of the links in the ring in the counterclockwise direction of the ring in previous time cycles; and (e) determining a predicted availability of the ring based on the clockwise and counterclockwise minimums.

14. The program storage device of claim 13, the method further comprising:
(g) segmenting the mesh network to determine the plurality of rings such that each ring representing a closed loop of switching devices is connected by links.

15. The program storage device of claim 13, the method further comprising:
(g) segmenting the mesh network to determine an intermediate plurality of rings such that each ring representing a closed loop of switching devices is connected by links; and
(h) determining the plurality of rings based on the intermediate plurality of rings such that each ring representing a closed loop of the intermediate plurality of rings is connected by overlapping switching devices.

16. The program storage device of claim 13, the method further comprising:
(g) receiving a request for a dedicated network connection to be provided by the mesh network between at least two locations;
(h) identifying which of the plurality of rings would be utilized to provide the requested dedicated network connection between the at least two locations; and
(i) determining whether the requested dedicated network connection is feasible based on the overall predicted availabilities determined in (f) for the plurality of rings identified in (h).

17. The program storage device of claim 13, the method further comprising:
(g) determining whether the overall predicted availability for a ring in the plurality of rings exceeds a threshold; and
(h) when the overall predicted availability of the ring is determined to exceed the threshold, sending an alert indicating that the ring needs to be modified to accommodate additional traffic.

18. The program storage device of claim 13, wherein the monitoring (a) comprises, repeatedly for a plurality of times, collecting, from switching devices connected to the bidirectional links, data indicating an amount of traffic flowing over the bidirectional link at the time.

* * * * *